(12) United States Patent
Kohl

(10) Patent No.: US 8,302,090 B2
(45) Date of Patent: Oct. 30, 2012

(54) CONFIGURABLE INDICATING DEVICE AND METHOD FOR MONITORING AND CONTROL IN FLUID SYSTEMS

(75) Inventor: Tony E. Kohl, Lakeland, FL (US)

(73) Assignee: Sensocou, Inc., Highland City, FL (US)

( * ) Notice: Subject to any disclaimer, the term of this patent is extended or adjusted under 35 U.S.C. 154(b) by 956 days.

(21) Appl. No.: 12/308,504

(22) PCT Filed: Jun. 20, 2007

(86) PCT No.: PCT/US2007/014399
§ 371 (c)(1),
(2), (4) Date: Dec. 16, 2008

(87) PCT Pub. No.: WO2007/149499
PCT Pub. Date: Dec. 27, 2007

(65) Prior Publication Data
US 2010/0095292 A1    Apr. 15, 2010

Related U.S. Application Data

(60) Provisional application No. 60/815,143, filed on Jun. 20, 2006.

(51) Int. Cl.
*G06F 9/44* (2006.01)
*G06F 3/048* (2006.01)
*G06F 1/26* (2006.01)

(52) U.S. Cl. ........ 717/173; 715/772; 715/825; 715/761; 713/300

(58) Field of Classification Search ............ 717/173
See application file for complete search history.

(56) References Cited

U.S. PATENT DOCUMENTS

| | | | |
|---|---|---|---|
| 4,570,217 A * | 2/1986 | Allen et al. | 700/83 |
| 5,287,514 A * | 2/1994 | Gram | 715/826 |
| 5,453,939 A * | 9/1995 | Hoffman et al. | 702/183 |
| 5,805,443 A | 9/1998 | Raffray et al. | |
| 6,005,577 A * | 12/1999 | Breitlow | 715/825 |
| 6,259,981 B1 | 7/2001 | Wilcosky | |
| 6,407,663 B1 | 6/2002 | Huggett | |
| 6,795,319 B2 | 9/2004 | Preston et al. | |
| 6,928,353 B2 | 8/2005 | Finley et al. | |
| 7,178,108 B1 * | 2/2007 | Workman et al. | 715/762 |
| 7,464,369 B1 * | 12/2008 | Banerjee et al. | 717/106 |
| 2004/0016457 A1 * | 1/2004 | Bolland | 137/391 |
| 2005/0091641 A1 * | 4/2005 | Starbuck et al. | 717/122 |
| 2006/0088948 A1 * | 4/2006 | McManus et al. | 438/14 |
| 2007/0016900 A1 * | 1/2007 | Brandt et al. | 717/168 |

(Continued)

*Primary Examiner* — Don Wong
*Assistant Examiner* — Theodore Hebert
(74) *Attorney, Agent, or Firm* — Liell & McNeil

(57) ABSTRACT

An apparatus for monitoring and/or controlling a fluid system includes a housing having at least one display mounted thereon and a sensor interface that includes at least one sensor configured to output signals corresponding to a sensed fluid characteristic. A computer readable memory is disposed within the housing and stores user configurable program parameters in a stored menu configuration partitioning the program parameters among a plurality of discrete menus. The apparatus further includes a user interface having an input device configured via outputting a menu reconfiguration command to adjust the stored menu configuration, and a processor disposed within the housing and configured to display the program parameters in the plurality of discrete menus according to the stored menu configuration. In an exemplary application, the apparatus is a differential pressure indicator having optional control/output features, internally or externally sourced 4-20 mA current output and infrared communication for uploading and/or downloading programming and data.

20 Claims, 3 Drawing Sheets

U.S. PATENT DOCUMENTS

| | | |
|---|---|---|
| 2007/0028231 A1* | 2/2007 | Kelso et al. .................... 717/174 |
| 2007/0240146 A1* | 10/2007 | Chinnadurai et al. ......... 717/168 |
| 2007/0280144 A1* | 12/2007 | Hodson et al. ................ 370/312 |
| 2008/0222621 A1* | 9/2008 | Knight et al. .................. 717/151 |
| 2008/0280380 A1* | 11/2008 | Dietz et al. ...................... 438/14 |

* cited by examiner

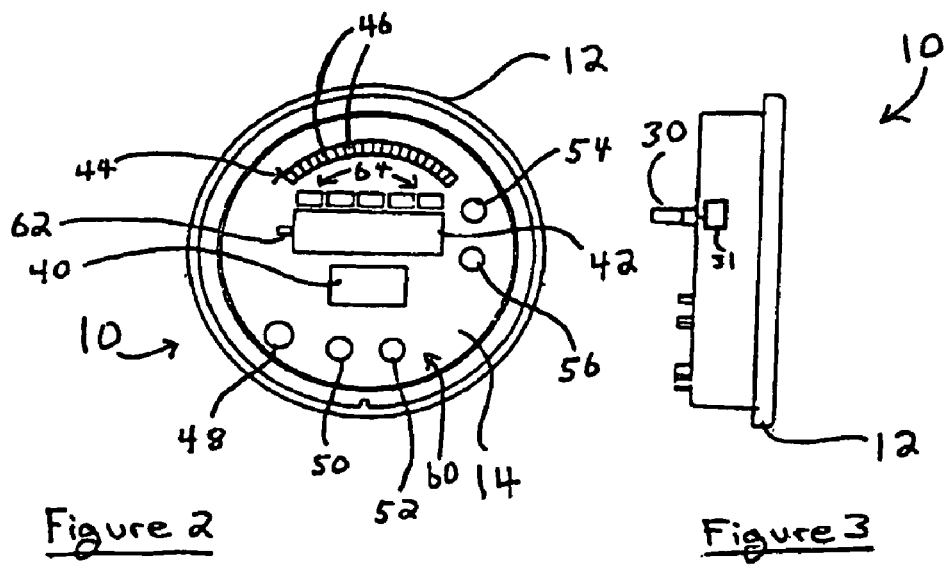
Figure 2
Figure 3
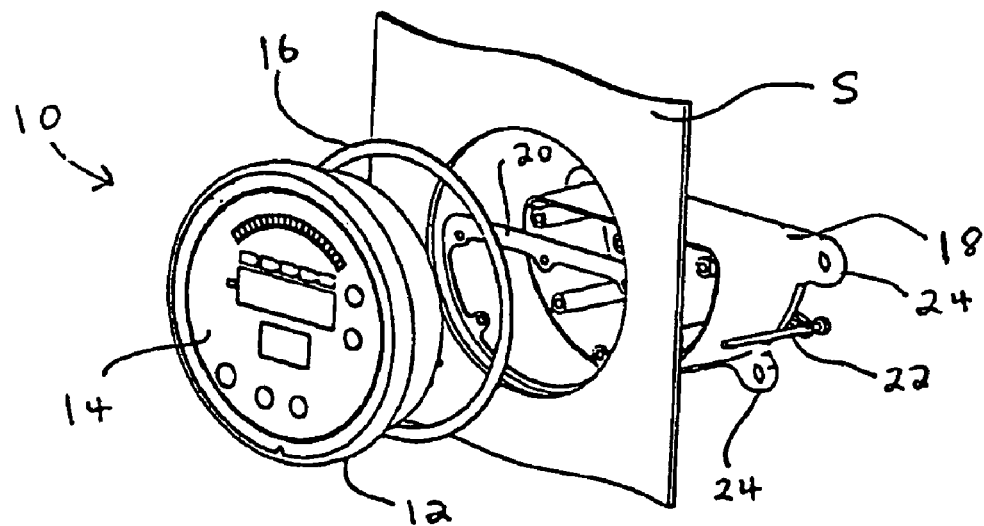
Figure 1

US 8,302,090 B2

CONFIGURABLE INDICATING DEVICE AND METHOD FOR MONITORING AND CONTROL IN FLUID SYSTEMS

This patent application Claims the Benefit of U.S. Provisional Patent Application Ser. No. 60/815,143, Filed Jun. 20, 2006

TECHNICAL FIELD

The present disclosure relates generally to indication and control instrumentation and strategies for use in fluid systems, and relates more particularly to an apparatus and method for fluid pressure monitoring and control where program parameters are displayed among discrete user configurable menus.

BACKGROUND

Gauges and other indicating devices have long been used in monitoring fluid systems, such as HVAC systems, clean room systems, paint booths, dust collectors, etc. A common instrument used for determining a fluid pressure parameter, such as differential fluid pressure, includes a movable indicating needle having a deflection state that corresponds with a difference in pressure across a membrane or the like. A typical application for such a device might be gauging a differential pressure between two separate areas. While such mechanical gauges are relatively stable and reliable, they do not enable direct control, data logging, and a host of other capabilities desirable in the context of modern fluid system applications. For instance, it may be desirable for a technician to obtain a record of maximum or minimum absolute pressures in one part of a fluid system, maximum or minimum differential pressures between separate parts of a fluid system, or even ranges between maxima and minima over a period of time. Other than visual inspection and recording, most mechanical systems do not provide these and other capabilities. The measurement precision available with mechanical instruments may also be insufficient for certain applications.

In an attempt to provide more sophisticated indication and control in various fluid system applications, engineers have developed a host of electronic systems to replace or supplement traditional mechanical gauges. Systems are known wherein membrane deflection, for example of a piezoresistive element, is used to generate an electrical signal representative of an absolute or differential pressure. Such systems are often equipped with a processor for interpreting the signals and displaying them on a display and/or logging pressure sensor data in electronic storage.

One differential pressure controller of this general class is manufactured by Dwyer Instruments of Michigan City, Ind., and known commercially as the Digihelic. This device has separate high pressure and low pressure ports to enable a sensing device to determine a differential pressure therebetween. There is further provided a menu structure whereby various of the functions of the device may be set to specifications, such as selection of units of measure in which monitored pressure will be displayed. While the ability to change certain of the parameters may be restricted, the Digihelic provides little, if any, flexibility in structuring the menus themselves.

A further shortcoming of the aforementioned instrument, as well as others of its general class, relates to the individualized programming and/or set-up required for multiple units. In other words, no facile means is known from the field of pressure instrumentation whereby multiple units can be readily provided with identical programming to suit identical or similar applications, or where logged data can readily be downloaded from multiple units, without additional wired connections.

The present disclosure is directed to one or more of the problems or shortcomings set forth above.

SUMMARY OF THE INVENTION

In one aspect, an indicating device for use in monitoring and/or controlling a fluid system includes a housing and a sensor interface disposed at least partially within the housing, the sensor interface being configured to receive sensor data corresponding to at least one fluid characteristic. The indicating device further includes a computer readable memory disposed within the housing and storing user configurable program parameters for processing the sensor data. The computer readable memory further stores a menu configuration partitioning the user configurable program parameters among a plurality of discrete menus. A user interface is further provided which has an input device configured via outputting a menu reconfiguration command to move one of the program parameters out of a first one of the menus and into a second one of the menus, of the stored menu configuration. A processor is further disposed within the housing and is configured to receive sensor data via the sensor interface and responsively output a data display signal according to at least one of the program parameters, and further configured to output a menu display signal according to the stored menu configuration.

In another aspect, the present disclosure provides an apparatus for monitoring and/or controlling a fluid system. The apparatus includes a housing having at least one display mounted thereon and a sensor interface that includes at least one sensor configured to output signals corresponding to a sensed fluid characteristic. A computer readable memory is disposed within the housing and stores user configurable program parameters in a stored menu configuration partitioning the program parameters among a plurality of discrete menus. The apparatus further includes a user interface having an input device configured via outputting a menu reconfiguration command to adjust the stored menu configuration, and a processor disposed within the housing and configured to display the program parameters in the plurality of discrete menus according to the stored menu configuration.

In still another aspect, the present disclosure provides a method of setting up an indicating device for use in monitoring and/or controlling a fluid system. The method includes displaying a menu of program parameters for an indicating device according to a first menu configuration, and configuring discrete menus of program parameters for the indicating device via a menu reconfiguration command from an input device to a processor of the indicating device. Configuring discrete menus further includes moving a first program parameter out of a first one of the menus and into a second one of the menus via the menu configuration command. The method still further includes verifying configuring of the discrete menus at least in part by displaying program parameters partitioned according to the menu reconfiguration command.

BRIEF DESCRIPTION OF THE DRAWINGS

FIG. 1 is an isometric view of a device and mounting assembly according to one embodiment;

FIG. 2 is a front view of a device according to one embodiment;

FIG. 3 is a side view of the device of FIG. 1;

DETAILED DESCRIPTION

Figure 4:
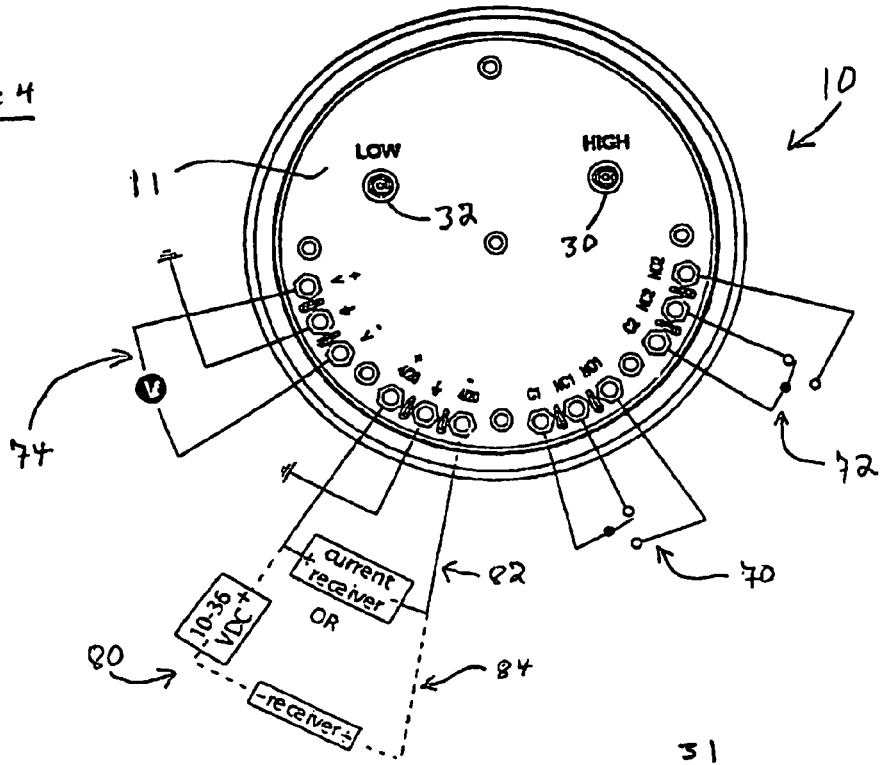
FIG. 4 is a back view of a device according to one embodiment.

Referring to FIG. 1, there is shown an indicating device 10 according to the present disclosure. Device 10 includes a housing 12 containing components to be described herein for monitoring and/or controlling a fluid system. A sealing ring or gasket 16 is provided for sealing device 10 during mounting to a substrate S. An optional weather proof cover 18 having a plurality of fastener mounting elements 24 for mounting with device 10 is also shown, and may further include one or more fasteners 22 for panel mounting device 10 in substrate S with attached housing 18. A second sealing gasket 20 or similar structure may also be included. It is contemplated that device 10 may be used in monitoring fluid pressures, for example, positive, negative, or differential pressures in an associated fluid system. Device 10 may also be provided with hardware and software that enables user configurability for monitoring and/or control of fluid systems in a manner providing numerous advantages over known systems. Exemplary applications include monitoring and/or control in fluid systems, which may be gaseous, liquid, or both, such as monitoring/control of duct static pressure, clean room pressure, building pressure, blower pressure, paint booth pressures, dust collectors, glove boxes, laminar flow hoods, cabinet purging applications, and in bubbler systems. Various other pressure-related applications are contemplated in the semiconductor, pharmaceutical, agricultural, chemical and petrochemical industries, etc.

While pressure instrumentation as described herein is one practical application of the teachings of the present disclosure, it is not thereby limited. Substantially any measurable variable in a fluid system may be monitored and/or controlled, such as pressure, flow rate or direction, velocity, temperature, humidity, electrical current, pH, fluid level. Further, the present disclosure may be implemented in substantially any proportional integral derivative control system or other instrument that provides process indication and/or control of any measurable variable of interest. Thus, it should be appreciated that while fluid pressure applications are emphasized herein, the present disclosure is not limited thereto. Moreover, while the following description mentions "control" of a fluid system as a practical implementation, the present disclosure is also not limited in this regard, and embodiments are contemplated which include only monitoring/indicating features as well as embodiments which additionally or alternatively include control features.

Referring also to FIG. 2, there are illustrated certain of the features of device 10 whereby a user may monitor and/or interact therewith. In particular, device 10 may include at least one display mounted on or in face plate 14. In one embodiment, a first display 40 may be provided which comprises a programming display whereupon discrete user configurable menus of available program parameters of device 10 may be displayed. As used herein the term "discrete" shall be understood to describe a unique menu separate from other menus viewable via display 40. Content and access to the menus may be dictated by user settable menu configuration information electronically stored in device 10, further described herein. Accordingly, a system wherein a single configurable menu is displayed would not provide display of discrete menus as contemplated herein, nor would such a system provide the advantages attendant to such a design. Display 40 may comprise any user perceptible indicating display, for example an LCD or an OLED display. In one embodiment, display 40 may be used in programming device 10 for control purposes. When not being used for programming, display 40 may be used to display units of measure for a monitored fluid characteristic, for example, or any combination of programming parameters a user has selected to be shown in a default menu. In the embodiment shown, display 40 is part of device 10, however, it should be appreciated that in other embodiments display 40 might be a display on a separate unit such as a PC, a PDA, a cell phone, or some other device capable of interacting with device 10.

Device 10 may further include a second display 42, for example a data display whereby sensor data to be described is received by device 10 and displayed in a user-configurable format such as via selected engineering units, or units of measure. For example, absolute or differential pressure sensor data may be displayed on display 42 in units of pounds per square inch, inches, feet, centimeters or millimeters of water column, inches or millimeters of mercury, pascals, kilopascals, BAR, mBARs or any other desirable unit. In one embodiment, display 42 may comprise a numeric display such as a plural-unit seven segment display, but might also be other sorts of displays depending upon the selected design. Device 10 may still further include a third display 44, which may consist of a process arch of a plurality of illuminable units 46 having an illumination state that corresponds with a measured parameter of interest. Rather than an arch, a straight line of LED's or the like might be used, or any other suitable geometric configuration.

In one embodiment, display 44 may illuminate progressively from left to right to mimic deflection of a mechanical needle, such as are used in earlier pressure indicating systems. A separate LED 62 or the like may be used to indicate whether differential pressure is positive or negative, for example, or whether positive pressure versus a vacuum is sensed. One half of display 44 might be illuminated to indicate 50% of a full scale reading in certain embodiments. Display 44 might also include LED's of differing colors to correspond with different conditions or levels of the parameter of interest. Display 44 and display 42 will typically both be used to display sensor data corresponding to the same measured variable, but in some embodiments could be used to indicate separate sensor data, for example one of displays 42 and 44 might display temperature, whereas the other of displays 42 and 44 might display pressure, differential pressure, flow rate, humidity, etc. Regardless of the particular display strategy, the use of a numerical and also a geometric display can provide a user with both the ability to do a quick visual check for an approximate reading, and also the ability to determine an actual level of the sensed parameter.

A plurality of indicators such as LED's 64, may also be provided which have illumination states corresponding to a presence or magnitude of a sensed fluid characteristic of interest. For example, a leftmost and a rightmost of LED's 64 might respectively be illuminated or not illuminated to indicate the on or off state of control switches (not shown in FIG. 2) of device 10. In one embodiment, device 10 may be equipped with one or more single pole double throw switches and an associated software package for control. Such "SPDT" switches may be configured via software to flip their state responsive to pressure setpoints, switch actuation, time delays, switch reset, etc. A middle one of LED's 64 might be used to indicate the state of an alarm of device 10, such as might be provided for indicating when a predetermined high pressure level, a predetermined low pressure level, or a predetermined differential pressure level is sensed. Alarm circuitry and/or software to illuminate an LED corresponding to an alarm might also be configured to generate a control signal to an on-board or remote audio alarm, a shutdown switch, a remote PC, cell phone, PDA, etc.

Device 10 may further include a user interface 60 for interacting with device 10 to monitor, reconfigure, download or upload programming or data, etc. User interface 60 will typically include at least one input device, and in most embodiments will include a plurality of control buttons, including a first control button 50, a second control button 52, and third and fourth control buttons 54 and 56. A communication port 48 may also be provided in device 10 and may be considered a part of user interface 60 for configuring device 10 and performing other functions described herein. In one embodiment, port 48 may be a wireless communication port such as an infrared port, whereas in other embodiments port 48 might be configured to accept a wired connection. The significance and exemplary use of user interface 60 will be further apparent from the description set forth hereinbelow.

Referring also to FIG. 3, there is shown a side view of device 10 illustrating a profile of housing 12 taken from the left relative to FIG. 2, and an input port 30 which comprises a pressure passage communicating with at least one pressure sensor 31. As discussed above, one application of device 10 will be in the monitoring and/or controlling of differential fluid pressure in a pressure system. To this end, dual ports may be provided, only one of which is visible in FIG. 3. Taken together, FIGS. 1-3 also illustrate the general shape of device 10 which may be configured such that device 10 can be retrofitted to existing pressure gauging systems. For example, in many instances it will be possible to simply swap device 10 for an existing mechanical or electronic pressure product via the mounting hardware shown herein, or other suitable mounting hardware, and make the appropriate fluid and power supply connections.

Turning now to FIG. 4, there is shown a back view of device 10. Device 10 may include a back plate having a high pressure port 30 and a low pressure port 32 therein, each of which may connect with a fluid passage extending through housing 12. A plurality of different electrical power, communication and control connections may also be accessible via back plate 11. Power supply circuitry 74 may be provided for powering device 10. In one embodiment device 10 will be configured via software and/or hardware to accept power from a universal power supply, and may automatically adjust to a relatively broad range of voltages, as well as different polarity. An end user may therefore have the flexibility to use the most convenient power supply available. In one embodiment, device 10 can automatically adjust to voltage within a range of about 16 to 400 VAC or VCD, or a range of about 16 to about 285 VAC or VDC. A power supply chip (not shown), addition capacitor and diode may also be included to enable powering via the relatively broad range described. Device 10 may also be equipped with output circuitry 80 for outputting a linear signal to a device coupled with device 10, such as a control device. Output circuitry 80 may include a first circuit portion 82 for internally sourced power, and a second circuit portion 84 for externally sourced power.

In one embodiment, the current output of circuitry 80 may be a range of between about 4 and about 20 mA. Device 10 may be configured via software such that a user can select a range of a sensed characteristic with which the 4-20 mA output corresponds. Where power is sourced internally via circuitry 82, maximum loop resistance may be relatively lower, for example about 750 ohms. Where power is sourced externally via circuitry 84, maximum loop resistance may be relatively higher, for example about 1800 ohms. Also shown in FIG. 4 is a first switching circuit 70 and a second switching circuit 72, comprising the single pole double throw switches mentioned above.

Figure 5:
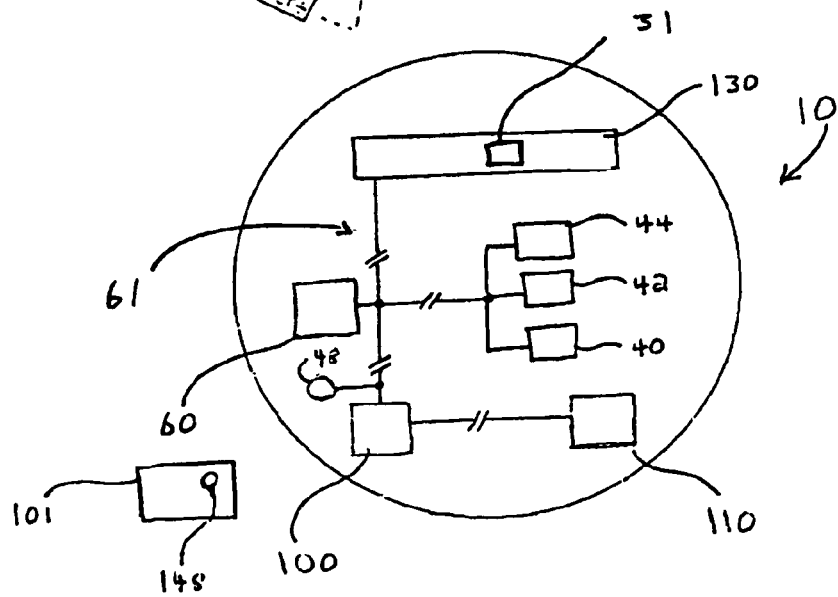
FIG. 5 is a schematic view of a device according to one embodiment.

Turning now to FIG. 5, there is shown a schematic representation of certain of the internal electronic components of device 10. As alluded to above device 10 may be computer controlled, and to this end may include a processor 100, any suitable processor known in the art. A computer readable memory 110, such as RAM, ROM, flash memory, a hard drive, etc. may be coupled with processor 100. Also shown is communication port 48. A second device or universal key 101, which may comprise a handheld device such as a PDA or cell phone, a PC or still some other device is shown positioned proximate device 10. Device 101 may also include a communication port 148 for uploading and/or downloading programming and data to or from device 10, further described herein. User interface 60 is also shown in FIG. 5, as are each of displays 40, 42 and 44. Sensor interface 130 is also coupled with processor 100 via input circuitry 61 and includes at least one sensor 31.

In one embodiment, processor 100 is configured to receive signals from sensor interface 130 corresponding to data from at least one sensor via input circuitry 61, in one illustrative case signals indicative of differential pressure as described herein. Processor 100 may output data display signals corresponding to the sensor data to at least one of displays 40, 42 and 44, and typically to each of displays 42 and 44 as described, depending upon the application. As used herein, "data display signal" should be understood to refer to an electronic communication signal from processor 100 prompting displays 42 and 44 to illuminate in a desired manner, as described above, to represent the sensed fluid characteristic of interest. The data display signal(s) may be generated responsive to inputs from sensor interface 130 and may be based also in part on user configured program parameters, such as selected units of measure. In other words, processor 100 will output signals based on sensor data received, and in a manner which can be selected by a user, e.g. inches of water column versus millimeters of mercury. Processor 100 may also be configured to output menu display signals to display 40 to display one of a plurality of menus of user configurable program parameters, stored in memory 110. In one embodiment, memory 110 will store a plurality of user configurable menus, each including a selected set of program parameters. Processor 100 will output menu display signals to display menus of the program parameters in accord with the menu configuration stored in memory 110, in response to user commands to display a particular menu.

A wide variety of program parameters may be available to a user for configuring device 10 in a multiplicity of ways. In one embodiment, user configurable program parameters may include a Control parameter, which determines what other parameters are or are not available in a set-up menu, further described herein. User configurable program parameters may further include set point settings, including set points for low and high absolute values of a fluid characteristic of interest, for example corresponding to turn-on and turn-off points, or as an absolute set point and a floating dead band. User configurable program parameters may also include actuation parameters, determining whether relays/switch circuitry 70 and 72 will react to increasing versus decreasing pressure. Operation of at least certain of LED indicators 64 may also vary based on the actuation parameters. Other program parameters may include set-point delays, setting the minimum amount of time that a monitored characteristic must be above or below a selected set point for a switch state to actuate. Still further user configurable program parameters may include alarm types and alarm operation features, reset parameters for logged data, mode selection, e.g. pressure display and/or control, velocity display and/or control and flow display and/or control. Units of measure for displaying the fluid characteristic(s) of interest may also be user configurable program parameters as described herein. As mentioned above, a wide variety of fluid characteristics may be monitored and/or controlled via device 10, and a correspondingly wide variety of program parameters may be stored in memory 110, viewed and/or adjusted via displays 40, 42 and 44, and controlled via processor 100. A full listing of available program parameters for an exemplary pressure indicating and controlling device may be found in Applicant's Installation and Operation Manual, Series A3 and A4, publicly available on the World Wide Web at URL: www.sensocon.com and incorporated by reference herein in its entirety.

Returning to the menu related features of device 10, in one embodiment processor 100 will output menu display signals to display 40 based on user inputted commands from user interface 60, as well as one or more user configurable menu configurations stored via memory 110. The present disclosure provides a configuration strategy and menu display and access capability contemplated to provide advantages over known systems in the field of fluid system monitoring and control. In one embodiment, memory 110 stores menu configurations which partition program parameters among a plurality of discrete menus. This capability enables an end user or OEM to place certain program parameters within certain menus to suit a particular application. This might include, for example, placing certain parameters in a main menu for regular access to enable a user to readily configure, e.g. change, certain program parameters such as sensor signal value thresholds necessary to turn on a remote device, trip an alarm, or for virtually any other conceivable use. Other program parameters might be placed in a set-up menu, for example the mode parameter mentioned above to set device 10 to monitor and/or control pressure versus velocity versus flow. Still other parameters might be placed in a secure menu, such that presence of an electronic security key or entry of an electronic security code is required to view, change or download certain programming, or view and/or download logged data. Still another menu, e.g. a configuration menu, may be used in manufacturing, installation, etc.

As alluded to above, one unique feature of the presently described menu structure is the ability of a user to move one program parameter out of a first menu and place that program parameter in a second menu. In contrast to certain earlier strategies having a single configurable menu, the present disclosure may utilize discrete menus, whereby program parameters are viewable, accessible, alterable, etc. via only one menu. This capability not only provides for convenient, flexible menu configurations, but provides an extra layer of security against unwitting or unauthorized viewing, altering, etc. of selected parameters. As an additional feature, the selected menus or other aspects of device 10 may be locked. For example, the stored menu configuration might be locked to prevent unauthorized modification. Authorization might take place by entry of an access code via user interface 60. Another means of locking device 10 may be via an infrared key. According to this approach, infrared signals received via port 48 may be used to disable or enable certain buttons, etc. of device 10. If locked via an infrared key, access via entering an access code with user interface 60 may be disabled.

The hardware and software elements of the present disclosure further provide for a set-up process whereby multiple units can be programmed quite readily, or logged data from multiple units obtained easily. As mentioned above, port 48 of device 10 may be used for communicating with device 10 via an auxiliary device 101, having a second port 148 compatible with port 48. While infrared communication between the respective devices is contemplated to be one practical implementation strategy, devices 10 and 101 might communicate via some other wireless medium or via communication lines, etc. In one embodiment, an OEM or end user might access device 10 to create a menu configuration which partitions program parameters as desired, or to adjust/configure program parameters as desired within an existing menu configuration. While in certain industries, individual configuration of a plurality of devices identical to device 10 might be undertaken, those skilled in the art will appreciate that individually programming or setting up numerous identical devices can be an onerous task. Rather than utilizing such a strategy, the present disclosure enables downloading of programming from device 10 to device 101, which can later be uploaded to another device and recorded on a memory thereof to configure the second device identically to an existing configuration of device 10. Ports 48 and 148 may be used for this purpose, transferring programming, etc. stored in memory 110 to a memory (not shown) of device 101. Resident programming on a second device similar or identical to device 10 may be replaced via uploading substitute programming from device 101, or vice versa, and overwriting resident programming stored thereon. As noted above, the stored menu configuration and program parameter settings/configuration may comprise all or part of the programming transferred via ports 48 and 148. In a similar vein, logged sensor data or other data may be collected from a plurality of devices similar or identical to device 10 to enable an end user to readily obtain data from a group of devices via downloading from a port such as port 48 of each of the devices to a device such as device 101. It will thus be readily apparent that inclusion of port 48 and appropriate software and/or hardware will provide substantial advantages over conventional designs wherein manual programming or data downloading from numerous different units is required. This strategy also improves over certain earlier designs wherein external memory devices such as smart cards and the like are plugged in to control devices to enable operation via programming stored on the external device. In contrast, the present disclosure permits the resident programming to actually be replaced by rewriting memory 110 via processor 100.

Figure 6:
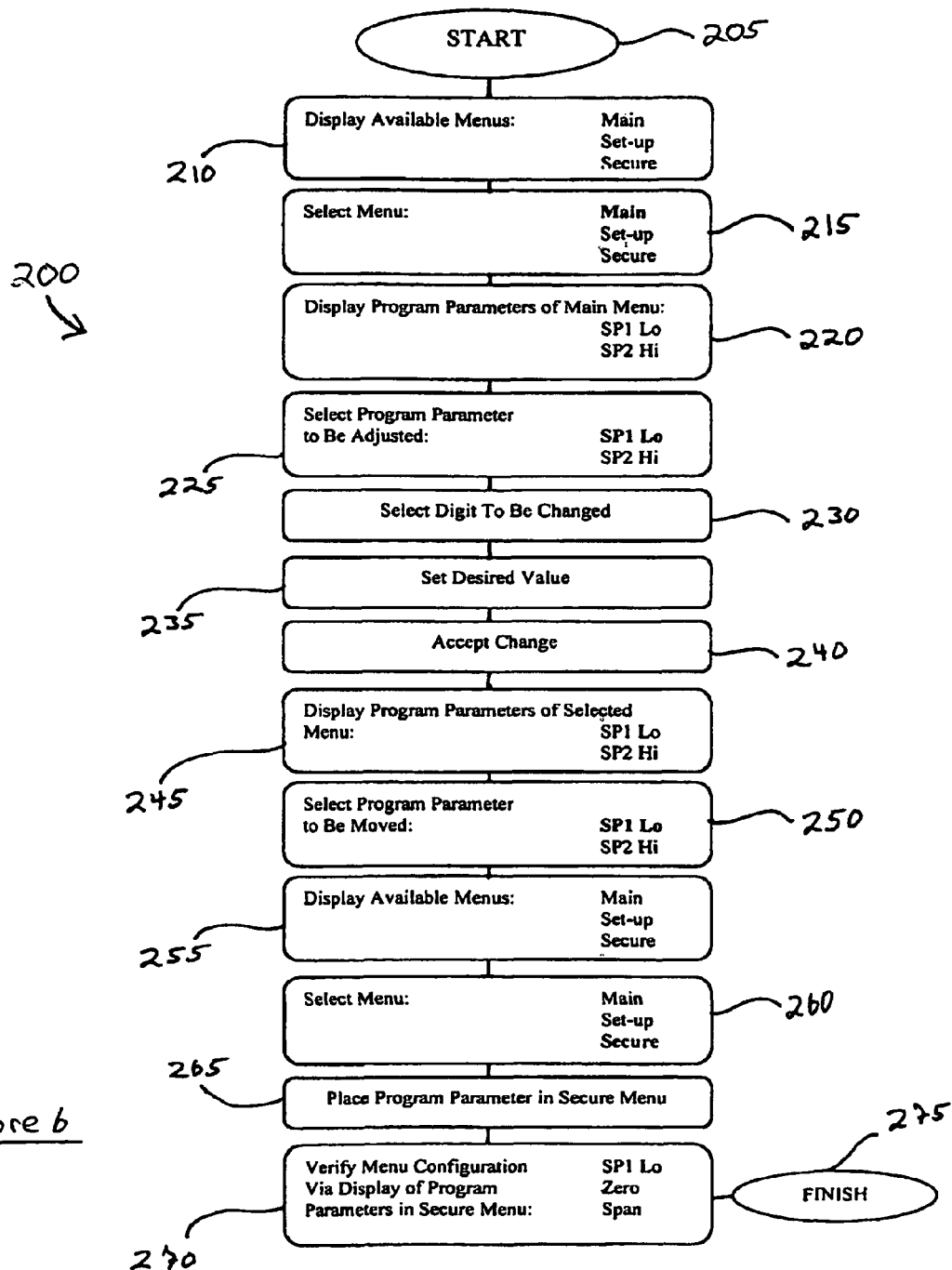
FIG. 6 is a programming flow chart according to one embodiment.

Turning now to FIG. 6, there is shown an exemplary configuration process for a device such as device 10 according to the present disclosure, via a flowchart 200. It should be appreciated that flowchart 200 is illustrative only, and greater or fewer of the steps shown therein might be used. It should be appreciated that other configuration processes will fall within the scope of the present disclosure despite substantial differences from the content and ordering of the process shown via FIG. 6. The process of flowchart 200 begins at a START, or initialize step 205 wherein device 10 is turned on and processor 100 initializes. Programming/configuring may be carried out by inputting user commands via user interface 60, and displaying the various options and selections via display 40. From step 205, the process may proceed to step 210 wherein a plurality of available menus are displayed, for example a Main menu, a Set-Up Menu and a Secure menu. From step 210, the process may proceed to step 215 wherein a user may select one of the menus, shown via highlighting in FIG. 6. Step 215 may also comprise depressing one of buttons 54 and 56 to move up or down the list of available menus. Buttons 54 and 56 may be labeled with an up arrow and a down arrow, respectively, to facilitate this operation. Actual selection of one of the menus may take place by pressing button 52, for example.

Once a menu is selected, for example the Main menu as shown, the process may proceed to step 220 wherein the program parameters located in the selected menu are displayed. From step 220, the process may proceed to step 225 wherein a program parameter to be adjusted or viewed may be selected. Buttons 54 and 56 may be used to navigate among the menu options, and button 52 depressed to select the subject program parameter. In the illustrated embodiment a user has selected SP1 Lo, corresponding to a low point at which a corresponding switch of device 10 may be enabled, disabled, etc. Selection of the subject program parameter may cause processor 100 to display via display 40 an existing numerical set-point for the selected parameter. From step 225, the process may proceed to step 230 wherein a user may select a decimal place or digit of the numerical set-point which is to be adjusted, for example by using buttons 50 and 52 to move back and forth across the decimal places. Buttons 50 and 52 may be labeled with a left arrow and a right arrow, respectively, for this purpose. In some embodiments, buttons 50 and 52 may include an "X" and a check mark, respectively, in addition to arrows, and corresponding respectively with "do not accept" or "back," and "accept" or "forward," etc. Other symbols, or no symbols, may label buttons 50, 52, 54 and 56 and the suggestions herein should be understood as purely illustrative and not limiting. Buttons 54 and 56 may be used to adjust the appropriate digit of the selected parameter up or down as desired, step 235. An entered change or adjustment may be accepted by pressing button 52 for a predetermined time, for example, step 240.

From step 240, the process may proceed to a second portion of the illustrated configuration process wherein a program variable, such as SP1 Lo, is moved to a different menu via a user inputted menu reconfiguration command. In other words after, or possibly prior to, setting the SP1 Lo program parameter at a desired numerical level, further configuration of device 10 may be desired to place the SP1 Lo parameter in a selected one of the other available menus. From step 240, the process may proceed to step 245 to again display the program parameters of a selected menu, in this case the Main menu. From step 245, the process may proceed to step 250 wherein buttons 54 and 56, for example, may be used to scroll through the list of parameters to highlight a selected parameter SP1 Lo. To complete step 250, a user may press button 50, for example, for a predetermined time. Responsive to depressing button 50 for this time period, a display of available menus into which the selected program parameter might be placed is displayed, in step 255. From step 255, the process may proceed to step 260 wherein a user can select/highlight the menu into which the selected parameter is to be placed, again for example using buttons 54 and 56. In the illustrated embodiment, a user might elect to place the selected SP1 Lo parameter in the Secure menu. From step 260, the parameter can be placed into the selected menu by depressing button 52, for example, in step 265, outputting a control command which removes the selected parameter from the Main menu and places the selected parameter in the secure menu.

It should be appreciated that any of the program parameters might be adjusted and/or moved in the described manner, and the present description of adjusting the SP1 Lo parameter is purely illustrative. From step 265, the process may proceed to step 270 wherein proper placing of the selected program parameter in the selected menu, e.g. the Secure menu, can be verified via displaying of the program parameters partitioned therein. The Main menu, from which the subject parameter is removed, might also be viewed to ensure that the parameter no longer available is for viewing/alteration via the Main menu. It will thus be appreciated that removing a program parameter from a first menu and placing it into a second menu can simultaneously reconfigure two menus via a control signal entered in step 265. From step 270, the process may proceed to step 275 to FINISH.

In view of the above features, functions and improvements it will be apparent that the present disclosure can provide fluid pressure products for a variety of applications that will be more user friendly, flexible and secure. It is contemplated that the present disclosure will be readily applied in "low pressure" sensing environments, for example, monitoring and/or controlling differential pressures up to about 10 PSI, however, higher pressure applications are contemplated. The present disclosure might additionally or alternatively be capable of various other operations. Additional sensor inputs might be provided to enable device 10 to monitor temperature as well as pressure characteristics. In addition, velocity of fluid flow or rate of fluid flow, i.e. volume per unit time, might be measured, for example by coupling elements known in the art as pitot tubes or orifice plates to inputs 30 and 32.

The present description is for illustrative purposes only and should not be construed to narrow the breadth of the present disclosure in any way. Thus, those skilled in the art will appreciate that various modifications might be made to the presently disclosed embodiments without departing from the intended spirit and scope of the present disclosure. For example, while device 10 is shown in the context of a unit integrating sensing equipment, computer processing and display hardware, the present disclosure is not thereby limited. In other embodiments, device 10 might comprise little more than a processor and memory configured via input and output circuitry and appropriate software to execute the functions described herein. Other aspects, features and advantages will be apparent upon an examination of the attached drawings and appended claims.

I claim:

1. An indicating device for use in monitoring or controlling a fluid system comprising:
 a housing;
 a sensor interface disposed at least partially within said housing and configured to receive sensor data corresponding to at least one fluid characteristic;
 a computer readable memory disposed within said housing and storing user configurable program parameters for processing said sensor data;
 said computer readable memory further storing a menu configuration partitioning said user configurable program parameters among a plurality of discrete menus;
 a user interface having an input device configured via outputting a menu reconfiguration command to move one of said program parameters out of a first one of said menus and into a second one of said menus, of said stored menu configuration, and such that the first and second menus are simultaneously reconfigured in response to the menu reconfiguration command; and
 a processor disposed within said housing configured to receive sensor data via said sensor interface and responsively output a data display signal according to at least one of said program parameters, and further configured to output a menu display signal according to said stored menu configuration.

2. The indicating device of claim 1 comprising a pressure indicating device, wherein said sensor interface includes input circuitry for at least one pressure signal, and wherein said processor being configured to determine at least one of, a positive pressure, a negative pressure and a differential pressure based on said at least one pressure signal and output said data display signal based thereon.

3. The indicating device of claim 2 wherein one of said user configurable program parameters includes selectable units of measure, and wherein said processor is configured to output said data display signal according to a selected unit of measure.

4. The indicating device of claim 2 further comprising a plurality of displays including an indicating display and a programming display, wherein said processor being configured to output said data display signal to said indicating display, and further configured to output said menu display signal to said programming display.

5. The indicating device of claim 4 further comprising a third display that includes a process arch having an illumination state based on said data display signal.

6. The indicating device of claim 2 further comprising a communication port coupled with said processor, wherein said processor is configured to replace resident programming stored on said computer readable memory with substitute programming uploaded via said communication port.

7. The indicating device of claim 6 wherein said processor is configured to download said user configurable program parameters and said stored menu configuration to a second computer readable memory via said communication port.

8. The indicating device of claim 7 wherein said communication port comprises a wireless communication port.

9. The indicating device of claim 1 comprising power supply circuitry having a plurality of different states to supply electrical power to said indicating device from a range of input voltages at either of a positive polarity and a negative polarity.

10. An apparatus for monitoring or controlling a fluid system comprising:
  a housing having at least one display mounted thereon;
  a sensor interface comprising at least one sensor configured to output signals corresponding to a sensed fluid characteristic;
  a computer readable memory disposed within said housing and storing user configurable program parameters in a stored menu configuration partitioning said program parameters among a plurality of discrete menus;
  a user interface having an input device configured via outputting a menu reconfiguration command to alter said stored menu configuration via moving one of said program parameters out of a first one of said menus and into a second one of said menus and such that said first and second menus are simultaneously reconfigured in response to the menu reconfiguration command; and
  a processor disposed within said housing and configured to display said program parameters in said plurality of discrete menus according to said stored menu configuration 11. The apparatus of claim 10 wherein said input device is configured to output a menu selection control signal to select one of said discrete menus for displaying via said at least one display.

12. The apparatus of claim 10 wherein said at least one display comprises a programming display and at least one indicating display, said processor being configured to display said program parameters in said plurality of discrete menus on said programming display and further configured to display sensor data received via said sensor interface on said indicating display.

13. The apparatus of claim 12 comprising at least one fluid passage extending through said housing, wherein said at least one sensor is configured to sense a pressure of fluid in said at least one fluid passage, and wherein said processor is configured to determine at least one of, a positive pressure, a negative pressure and a differential pressure based on inputs from said at least one sensor.

14. The apparatus of claim 13 wherein said at least one fluid passage comprises a first fluid passage extending through said housing and a second fluid passage extending through said housing, wherein said at least one sensor is operable to sense fluid pressure of said passages, and wherein said processor is configured to determine a differential pressure between said passages based on inputs from said at least one sensor and output a corresponding differential pressure signal to said at least one indicating display.

15. The apparatus of claim 14 wherein said at least one indicating display comprises a seven segment display having a display state corresponding to said differential pressure signal and a process arch having an illumination state also corresponding to said differential pressure signal.

16. The apparatus of claim 12 wherein said computer readable memory stores said user configurable program parameters in a stored menu configuration that comprises at least three menus, one of which is a secure menu.

17. The apparatus of claim 10 further comprising a wireless communication port coupled with said processor.

18. A method of setting up an indicating device for use in monitoring or controlling a fluid system comprising the steps of:
  displaying a menu of program parameters for an indicating device according to a first menu configuration;
  configuring discrete menus of program parameters for the indicating device via a menu reconfiguration command from an input device to a processor of the indicating device;
  wherein configuring discrete menus further includes moving a first program parameter out of a first one of the menus and into a second one of the menus via said menu reconfiguration command and such that the first and second menus are simultaneously reconfigured in response to the menu reconfiguration command; and
  verifying configuring of the discrete menus at least in part by displaying program parameters partitioned according to the menu reconfiguration command.

19. The method of claim 18 further comprising a step of restricting configuring of program parameters within a secure menu, wherein the configuring step further comprises moving at least one program parameter out of a non-secure menu and into the secure menu.

20. The method of claim 18 wherein the configuring step further comprises configuring the menus at least in part by replacing resident programming with substitute programming via a wireless communication link of the indicating device.

* * * * *